(12) United States Patent
Lin et al.

US011501423B2

(10) Patent No.: US 11,501,423 B2
(45) Date of Patent: *Nov. 15, 2022

(54) DOT-MATRIX PRODUCT INFORMATION ENCODING FOR FOOD TRACEABILITY

(71) Applicant: INTERNATIONAL BUSINESS MACHINES CORPORATION, Armonk, NY (US)

(72) Inventors: Ding Ding Lin, Beijing (CN); Changrui Ren, Beijing (CN); Yong Qing Xue, Beijing (CN); Bo Zhang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 328 days.

This patent is subject to a terminal disclaimer.

(21) Appl. No.: 16/875,011

(22) Filed: May 15, 2020

(65) Prior Publication Data

US 2020/0279365 A1    Sep. 3, 2020

Related U.S. Application Data

(63) Continuation of application No. 16/220,854, filed on Dec. 14, 2018, now Pat. No. 10,685,436, which is a (Continued)

(51) Int. Cl.
*G06T 7/00* (2017.01)
*H04N 19/17* (2014.01)
(Continued)

(52) U.S. Cl.
CPC ......... *G06T 7/0004* (2013.01); *G06Q 10/087* (2013.01); *G06T 9/00* (2013.01);
(Continued)

(58) Field of Classification Search
CPC ........... G06T 7/0004; G06T 9/00; G06T 7/00; G06T 2207/30128; G06Q 10/087; G06V 10/42; G06V 30/224; H04N 19/17
See application file for complete search history.

(56) References Cited

U.S. PATENT DOCUMENTS 5,369,261 A    11/1994 Shamir
5,914,787 A     6/1999 Satoh
(Continued)

FOREIGN PATENT DOCUMENTS

CN    1560778 A     1/2005
CN    1841425 A    10/2006
(Continued)

OTHER PUBLICATIONS

Cognex, "Food Traceability, Brand Protection, Code Quality, and Compliance," Cognex Corporation; 2017; URL: http://www.cognex.com/food-traceability.aspx?langtype=2057&locale=in; Retrieved: Jan. 10, 2017; 3 pages.
(Continued)

*Primary Examiner* — Tat C Chio
(74) *Attorney, Agent, or Firm* — Cantor Colburn LLP; Vazken Alexanian

(57) ABSTRACT

A method for encoding dot-matrix product information method includes identifying, via a processor, a dot-matrix grid size. The method further includes evaluating, via the processor, one or more dot pattern variation levels. In some aspects, the method includes retrieving, via the processor, an encoding structure indicative of a plurality of product information attributes. The method also includes determining, via the processor, whether an alpha-numeric digit at a dot pattern variation level can include a plurality of product information. The method further includes outputting, via the processor, a dot pattern code map. In some aspects, the dot pattern code map is indicative of a relationship between each
(Continued)

of the product information attributes and the plurality of values for each of the product information attributes.

20 Claims, 12 Drawing Sheets

Related U.S. Application Data continuation of application No. 15/404,741, filed on Jan. 12, 2017, now Pat. No. 10,223,783.

(51) Int. Cl.
*G06Q 10/08* (2012.01)
*G06V 10/42* (2022.01)
*G06V 30/224* (2022.01)
*G06T 9/00* (2006.01)

(52) U.S. Cl.
CPC ............ *G06V 10/42* (2022.01); *G06V 30/224* (2022.01); *H04N 19/17* (2014.11); *G06T 7/00* (2013.01); *G06T 2207/30128* (2013.01)

(56) References Cited

U.S. PATENT DOCUMENTS

| | | | |
|---|---|---|---|
| 7,793,853 B2 | 9/2010 | Silverbrook | |
| 10,223,783 B2* | 3/2019 | Lin | G06V 10/42 |
| 10,685,436 B2* | 6/2020 | Lin | G06V 10/42 |
| 2004/0246529 A1 | 12/2004 | Pruden | |
| 2004/0247874 A1 | 12/2004 | Ryzi et al. | |
| 2006/0028520 A1 | 2/2006 | Vonwiller | |
| 2006/0274114 A1 | 12/2006 | Silverbrook | |
| 2010/0220364 A1 | 9/2010 | Picard | |
| 2011/0132986 A1 | 6/2011 | Shigeta | |
| 2011/0142294 A1 | 6/2011 | Sagan | |
| 2013/0321351 A1 | 12/2013 | Paul | |
| 2014/0107939 A1 | 4/2014 | Jaunakais | |
| 2015/0108220 A1 | 4/2015 | Gu et al. | |
| 2019/0122359 A1 | 4/2019 | Lin et al. | |

FOREIGN PATENT DOCUMENTS

| | | |
|---|---|---|
| CN | 101882265 A | 11/2010 |
| CN | 102542341 A | 7/2012 |
| CN | 102760240 A | 10/2012 |
| CN | 103099297 A | 5/2013 |
| CN | 103294917 A | 9/2013 |
| CN | 103473653 A | 12/2013 |
| CN | 103530808 A | 1/2014 |
| CN | 103678985 A | 3/2014 |
| CN | 103761554 A | 4/2014 |
| EP | 2023264 A1 | 2/2009 |
| WO | 2013082392 A1 | 6/2013 |

OTHER PUBLICATIONS

Lin et al., "Dot-Matrix Product Information Encoding for Food Traceability," U.S. Appl. No. 16/220,854, filed Dec. 14, 2018.
List of IBM Patents or Patent Applications Treated as Related; Date Filed: May 15, 2020; 2 pages.

* cited by examiner

FIG. 2

DOT-MATRIX PRODUCT INFORMATION ENCODING FOR FOOD TRACEABILITY

DOMESTIC PRIORITY

This application is a continuation of U.S. application Ser. No. 16/220,854, entitled "DOT-MATRIX PRODUCT INFORMATION ENCODING FOR FOOD TRACEABILITY," filed Dec. 14, 2018, which was a continuation of U.S. application Ser. No. 15/404,741, entitled "DOT-MATRIX PRODUCT INFORMATION ENCODING FOR FOOD TRACEABILITY," filed Jan. 12, 2017, having U.S. Pat. No. 10,223,783, the contents of which are incorporated by reference herein in their entirety.

BACKGROUND

The present disclosure relates to product information encoding, and more specifically, to dot-matrix product information encoding.

Food traceability is important to food safety. A key to tracking & tracing food in the distribution chain is recordation of product information adequately throughout the distribution chain. Tracking & tracing codes for food products are commonly printed on food packaging using dot-matrix printing, which may become partially or completely unreadable during the manufacturing and/or distribution process.

SUMMARY

According to one or more embodiments of the present invention, a computer-implemented method for encoding dot-matrix product information is described. The described method includes identifying, via a processor, a dot-matrix grid size. The method further includes evaluating, via the processor, one or more dot pattern variation levels. In some aspects, the method includes retrieving, via the processor, an encoding structure indicative of a plurality of product information attributes. The method also includes determining, via the processor, whether an alpha-numeric digit at a dot pattern variation level can include a plurality of product information. The method further includes outputting, via the processor, a dot pattern code map. In some aspects, the dot pattern code map is indicative of a relationship between each of the product information attributes and the plurality of values for each of the product information attributes.

According to one or more embodiments of the present invention, a system for encoding dot-matrix product information is described. The described system includes a processor configured to identify a dot pattern grid size. The processor can also be configured to evaluate one or more dot pattern variation levels. The processor may be further configured to retrieve an encoding structure indicative of a plurality of product information attributes. In some aspects, the processor may determine whether an alpha-numeric digit at a dot pattern variation level can include the plurality product information attributes. The processor is also configured to output a dot pattern code map. The dot pattern code map is indicative of a relationship between each of the product information attributes and the plurality of values for each of the product information attributes.

According to one or more embodiments of the present invention, a computer program product for encoding dot-matrix product information is described. The computer program product includes a computer readable storage medium having program instructions embodied therewith. The program instructions are executable by a processor to cause the processor to perform a method. The method includes identifying, via a processor, a dot-matrix grid size. The method further includes evaluating, via the processor, one or more dot pattern variation levels. In some aspects, the method includes retrieving, via the processor, an encoding structure indicative of a plurality of product information attributes. The method also includes determining, via the processor, whether an alpha-numeric digit at a dot pattern variation level can include a plurality of product information. The method further includes outputting, via the processor, a dot pattern code map. In some aspects, the dot pattern code map is indicative of a relationship between each of the product information attributes and the plurality of values for each of the product information attributes.

According to one or more embodiments, another computer-implemented method for encoding dot-matrix product information is described. The described method includes outputting, via a processor, a request for user input indicative of a dot pattern grid size. The method also includes receiving, via the processor, user input and evaluating one or more dot pattern variation levels. The method further includes outputting a request for user input indicative of a plurality of product information attributes. In some aspects the method includes receiving, via the processor, plurality of product information attributes. The method can also include creating, via the processor, for every alpha-numeric digit, an encoding structure, wherein the encoding structure is indicative of a plurality of product information attributes and a plurality of values for each of the product information attributes. The method further includes outputting, via the processor, a dot pattern code map, wherein the dot pattern code map is indicative of a relationship between each of the product information attributes and the plurality of values for each of the product information attributes.

According to one or more embodiments, another computer-implemented method for encoding dot-matrix product information is described. The described method includes retrieving, via the processor, an encoding structure indicative of a plurality of product information attributes and a plurality of values for each of the product information attributes. The method also includes evaluating, via the processor, dot-matrix grid size. The method further includes determining, via the processor, whether an alpha-numeric digit at a dot pattern variation level can the plurality product information attributes. In some aspects, the method further includes outputting, via the processor, a dot pattern code map based on the minimum dot-matrix grid size. The dot pattern code map is indicative of a relationship between each of the product information attributes and the plurality of values for each of the product information attributes. In other aspects, each alpha-numeric digit can encode all of the plurality of product information attributes.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 2 depicts an altered dot-matrix tracking information, according to one embodiment;

DETAILED DESCRIPTION

Some geographic regions require food and drug production facilities to have systems in place to provide a trail of information that follows each item through the supply chain. To ensure food and drug safety and efficient recalls, some manufacturers must be able to identify and locate any item in the food supply chain and quickly trace back its source one or more steps in the supply chain, in and trace forward to its destination one or more steps. A standard and widely used format and method for printing product tracking information is dot-matrix. The product tracking information can include information such as manufacturer, product identification, lot number, expiry information, and even a unique serial number on virtually any finished good.

Figure 1:
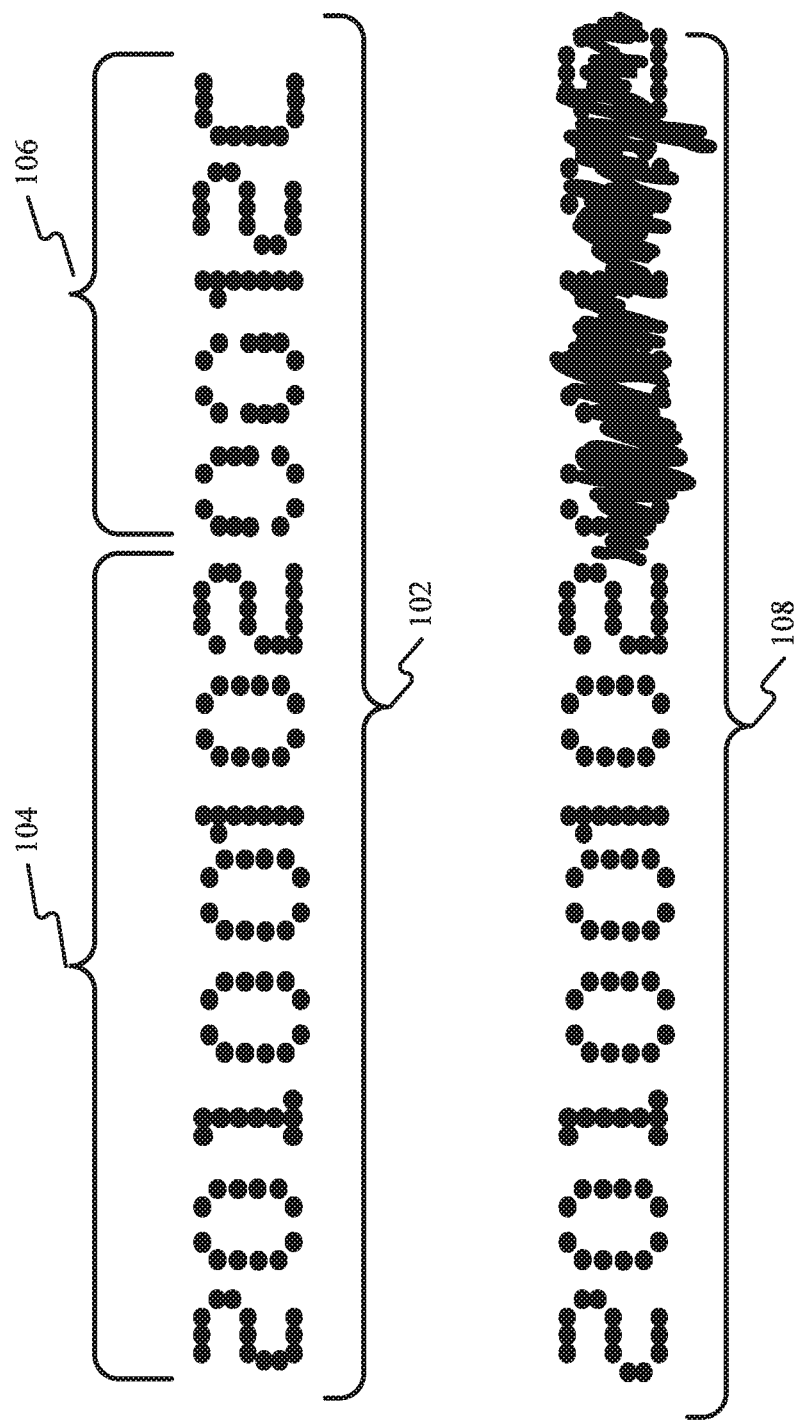
FIG. 1 depicts an exemplary dot-matrix tracking information, according to one embodiment.

In product tracking systems that track food manufacturing and distribution, dot-matrix product information printed on product packaging may become damaged or be altered. Tainted food products become untraceable when a portion of its dot-matrix product information is destroyed. FIG. 1 depicts exemplary dot-matrix tracking information 102, according to one embodiment. In the example of FIG. 1, product information 102 can include a date portion 104 (which is, in this example, Jan. 1, 2010) and a code portion 106.

Date portion 104 can include calendar date information indicating a production (manufacturing) date, an expiration date, or other date-related information.

Code portion 106 may include various encoded numbers and letters, which represent various manufacturing and distribution stream record such as place of origin, production unit, packaging line, task identification, hours and minutes timestamp, etc. The particular meaning or arrangement of code portion 106 varies according to the manufacturer or distributor. For example, one or more digits may identify a place of origin, the next digit may signify the particular packaging line, the next digit may signify a task serial number, etc. In some countries, food products may not be legally sold without tracking information intact. Nevertheless, some product tracking information may include one or more altered digits, as shown in altered code information 108. Most resellers, will not buy or sell items without production date information, but may allow products having the code portion 106 altered or destroyed. That is to say, regardless of local laws to the contrary, resellers may sell illegally obtained items that appear to be safe (because they are within their stated expiration period), but their origin cannot be accurately determined because the code portion 106 has been obscured.

Figure 2:
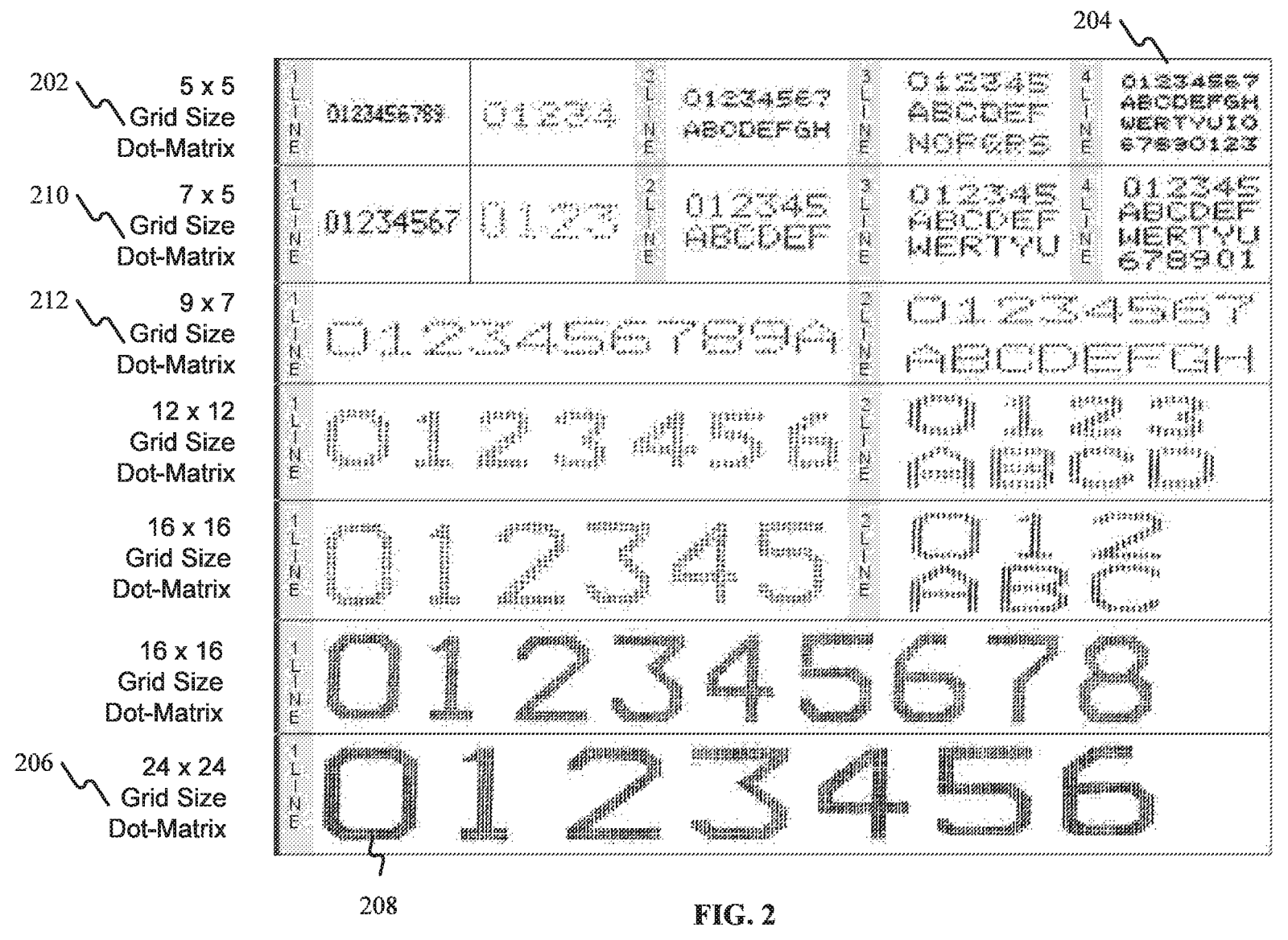

Embodiments of the present disclosure are directed to encoding and decoding a full dataset of tracking information in the date portion of dot-matrix printed product tracking information, which may preserve all product tracking information in one or more digits of a dot-matrix printed date. According to one or more embodiments, tracking information is encoded into the date portion of dot-matrix printed product tracking information by varying the patterns of the dots (i.e., the dot patterns) that are used to form the digits that make up the production date reflected in the production data portion of the dot-matrix printed product tracking information. For example, according to some embodiments, a production date may be encoded to include additional production attributes (such as place of origin, packaging line, task serial number, etc.), using dot-matrix dot pattern variations, which can be subsequently decoded to reveal the corresponding expanded product information. Dot-matrix printed alpha-numerics may take various forms depending on the dot-matrix grid size used for printing. FIG. 2 depicts various alpha-numeric digits printed using a plurality of dot-matrix sizes. Referring now to FIG. 2, each grid size shows an exemplary resolution for the printed digits. For example, a 5×5 grid size 202 is composed of 5 dots horizontally and 5 dots vertically. A 5×5 grid size creates a relatively low resolution digit when printing smaller digits (shown as "4 LINE" digits 204). On the other extreme, a 24×24 grid size 206 is formed with 24 dots horizontally and 24 dots vertically. As shown on 24×24 grid size 206 in FIG. 2, a larger grid size creates relatively high resolution digits, where each digit (e.g., digit 208) is composed of a 24×24 dots in the matrix.

Figure 3A:
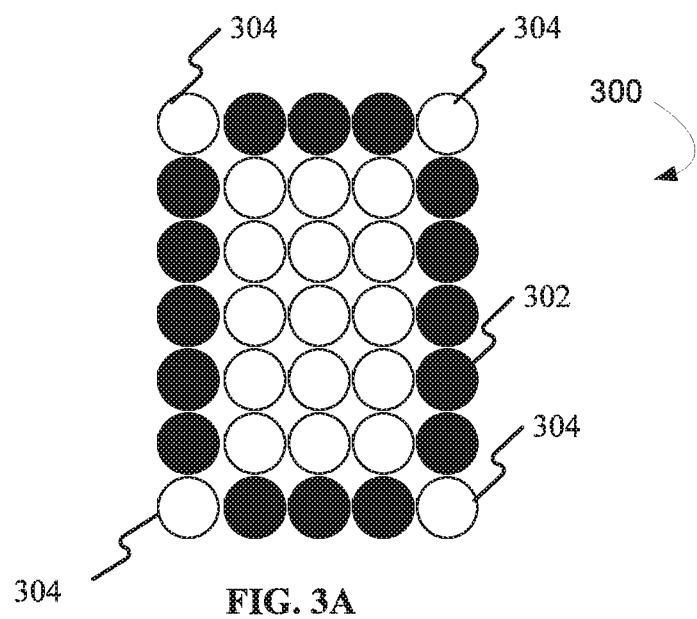
FIG. 3A depicts an exemplary variation for the alpha-numeric digit "0" using a 7×5 dot-matrix grid size, according to one embodiment.

As shown in FIG. 2, the smaller grid sizes (e.g., 5×5 grid size 202, 7×5 grid size 210, and 9×7 grid size 212) use fewer dots in the matrix to form the digit. FIG. 3A depicts an exemplary variation 300 for the alpha-numeric digit "0" using a 7×5 dot-matrix grid size, according to one embodiment. Referring now to FIG. 3A, in a 7×5 grid size as shown in variation 300, the "0" can be represented using the outer edge dots 302 in the grid. Although the variation shown in FIG. 3A depicts the corner dots 304 as empty, it would not be difficult to read the numeral if the corner dots 304 were also black (not shown).

Figure 3B:
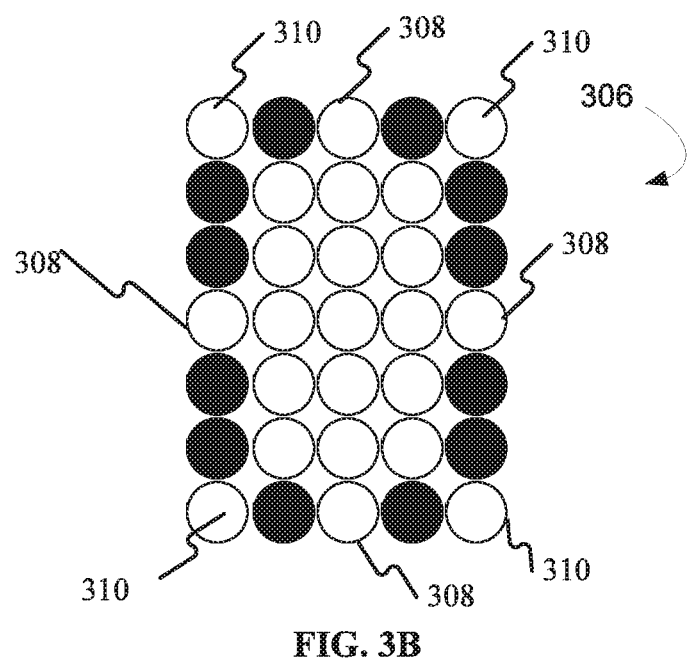
FIG. 3B depicts an another exemplary variation for the alpha-numeric digit "0" using a 7×5 dot-matrix grid size, according to one embodiment.

FIG. 3B depicts an another exemplary variation 306 for the alpha-numeric digit "0" using a 7×5 dot-matrix grid size, according to one embodiment. As shown in variation 306, the dots missing are middle edge dots 308 and corner dots 310. Using variation 306 it is still not difficult to discern that the digit represented is a "0." Notably, the dot pattern variation 300 for "0" shown in FIG. 3A is unique from the dot pattern variation 306 for "0" shown in FIG. 3B, because the missing dots 304 are in different locations of the matrix grid.

Figure 4:
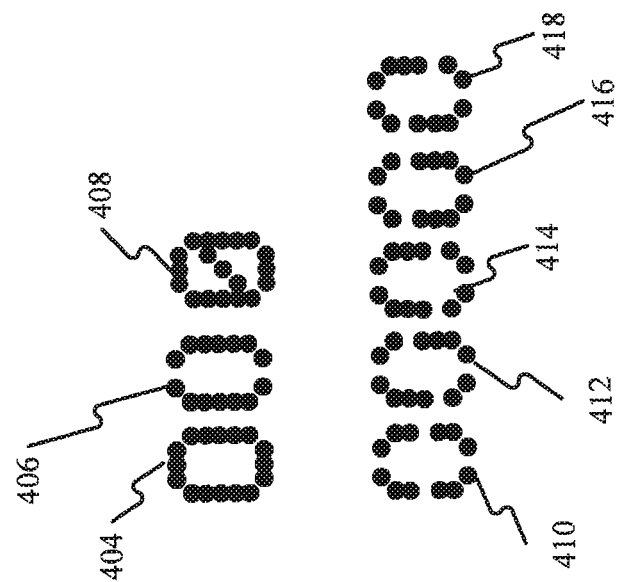
FIG. 4 depicts a plurality of exemplary variations for the alpha-numeric digit "0" using a 7×5 dot-matrix grid size, according to one embodiment.

FIG. 4 depicts a plurality of exemplary variations for the alpha-numeric digit "0" using a 7×5 dot-matrix grid size, according to one embodiment. The dot pattern 404 is differentiated from the dot pattern 406 by the middle dot at the top and bottom of the dot pattern that is used to represent the digit "0." More particularly, the dot pattern 406 is missing only the top middle and bottom middle dots, whereas the dot pattern 404 is missing only the corner dots. The dot pattern 410 is similar to the dot pattern shown with respect to FIG. 3B. The dot patterns 408 and 412-418, although not exhaustive, demonstrate different ways that the alpha-numeric dot-matrix digit "0" may be represented using this particular grid size. Notably, the fewer dots used to represent each particular dot pattern, the more distortion in that dot pattern. More dot patterns with less distortion can be achieved for a complex (i.e., higher-order) dot-matrix such as a 12×12 dot-matrix grid size.

Figure 5:
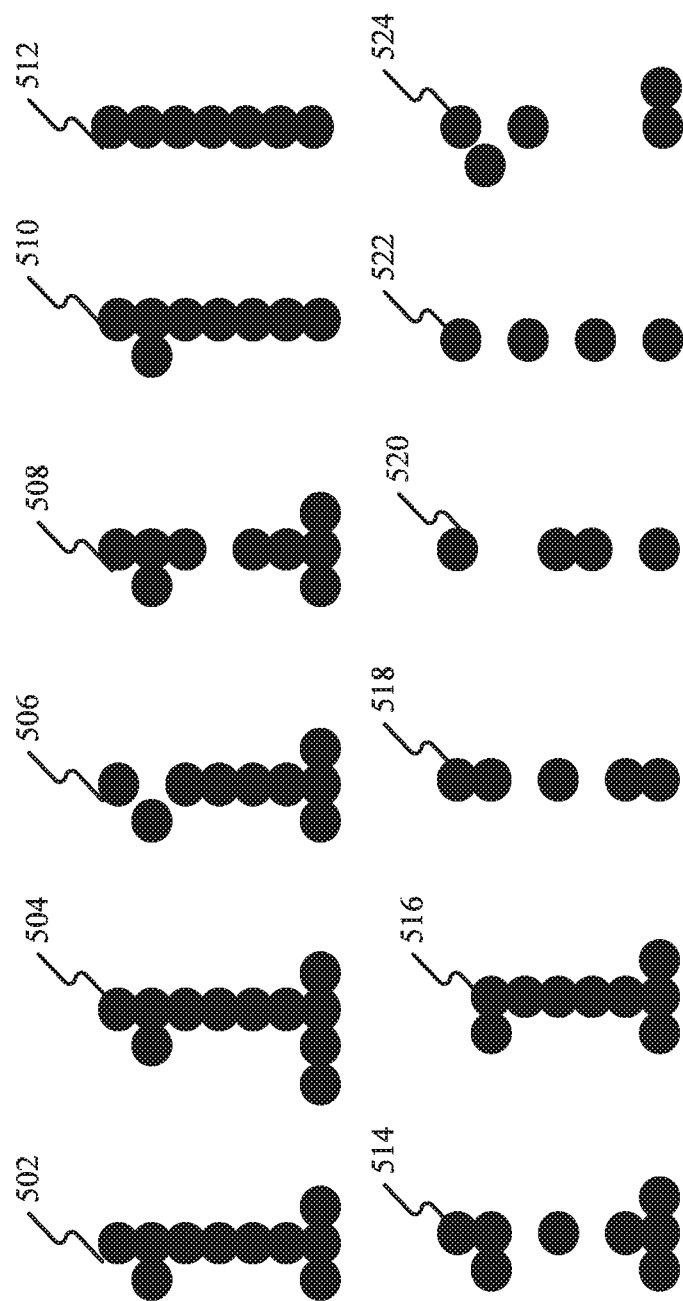
FIG. 5 depicts a plurality of exemplary variations for the alpha-numeric digit "1" using a 7×5 dot-matrix grid size, according to one embodiment.

When the grid size is relatively small (e.g., 7×5), the number of different dot pattern configurations or variations that are available to represent a particular digit is fewer than the number of ways available to represent the same digit using a larger grid size. For example, referring again to FIG. 2, using the 5×5 grid size, the first alpha-numeric digit "0" has significantly fewer dot pattern variations available to it than the "0" shown in the 24×24 grid size, simply because of the number of dots in each respective grid are fewer. FIG. 5 depicts a plurality of exemplary variations for the alpha-numeric digit "1" using a 7×5 dot-matrix grid size, according to one embodiment. As shown in FIG. 5, dot patterns 502-518 are readily identifiable as the digit "1," but dot patterns 520-524 become increasingly distorted as more and more dots are omitted in the dot-matrix grid.

Accordingly, although a plurality of dot patterns exists, the usable dot patterns for the purpose of the digit being human-readable may be fewer. For each digit 0-9, it can be said that there are a finite number of identifiable (human-readable) dot pattern variations of the dot-matrix printed digit available, which are a function of the particular digit and the grid size. More particularly, for each alpha numeric digit printed in dot-matrix form, there exists a maximum number of dot pattern variations available, where not all dot patterns (e.g., dot patterns 520-524) are usable. There also exists a minimum number of dot patterns available, all of which are readily readable with minimal distortion.

According to some embodiments, a dot-matrix dot pattern variation level is indicative of the minimum number of dot pattern variations available for a particular alpha-numeric digit, and is signified by the letter "k." Stated in other terms, for all alpha-numeric digits printable in a particular dot-matrix grid size, there are at least "k" unique ways (i.e., dot patterns) to represent any one digit respective to the dot-matrix grid size. According to some embodiments, the value of dot pattern variation level k is different for each dot-matrix grid size. In other aspects, the value of dot matrix variation level k may also differ with respect to a particular font used.

Figure 6:
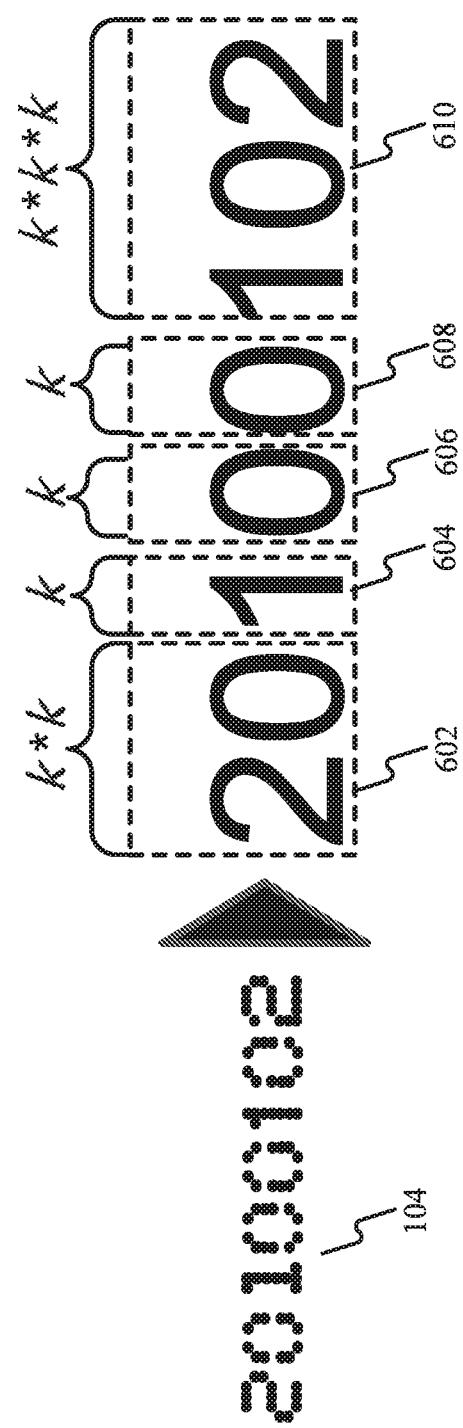
FIG. 6 depicts an exemplary encoding scheme for a production date, according to one embodiment.

According to some embodiments, a product information attribute can indicate product manufacturing information. For example, product information attributes may indicate a place of origin, a production date, a production unit, a packaging line, a task serial number, a batch number, an inspector identification number, etc. Where each alpha-numeric digit has k unique ways (i.e., dot pattern variations) of representing the digit using a dot-matrix of a particular grid size, two digits used together may represent k×k unique attributes. For example, referring back to FIG. 1, according to some embodiments, date portion 104 may encode a plurality of attributes using dot-matrix dot pattern variations, which can be decoded to reveal all of the product information 102 even if a code portion 106 (describing one or more information attributes) has been altered or destroyed. FIG. 6 depicts an exemplary encoding scheme for a production date, according to one embodiment.

Referring now to FIG. 6, the date portion 104 is depicted partitioned into five product information portions 602-610. In some aspects, each partition contains between one and three digits. Although groupings of one to three digits are represented in FIG. 6, it should be appreciated that any number of digits or groupings are possible. The grouping of the partitions is decided by the number of different ways each attribute needs to be represented. For example, product information portion 602 can represent a place of origin. In this case, there may be k×k different places of origin that are recordable using a particular grid size of 7×5. If product information portion 604 includes 1 digit, then there are a total number of k products encodable with this scheme. If product information portion 606 represents the attribute "unique packaging line," then there are k packaging lines (or less) that may be represented with portion 606. If portion 610 represents a time stamp, then there are k×k×k possible time stamps available for encoding.

Figure 7:
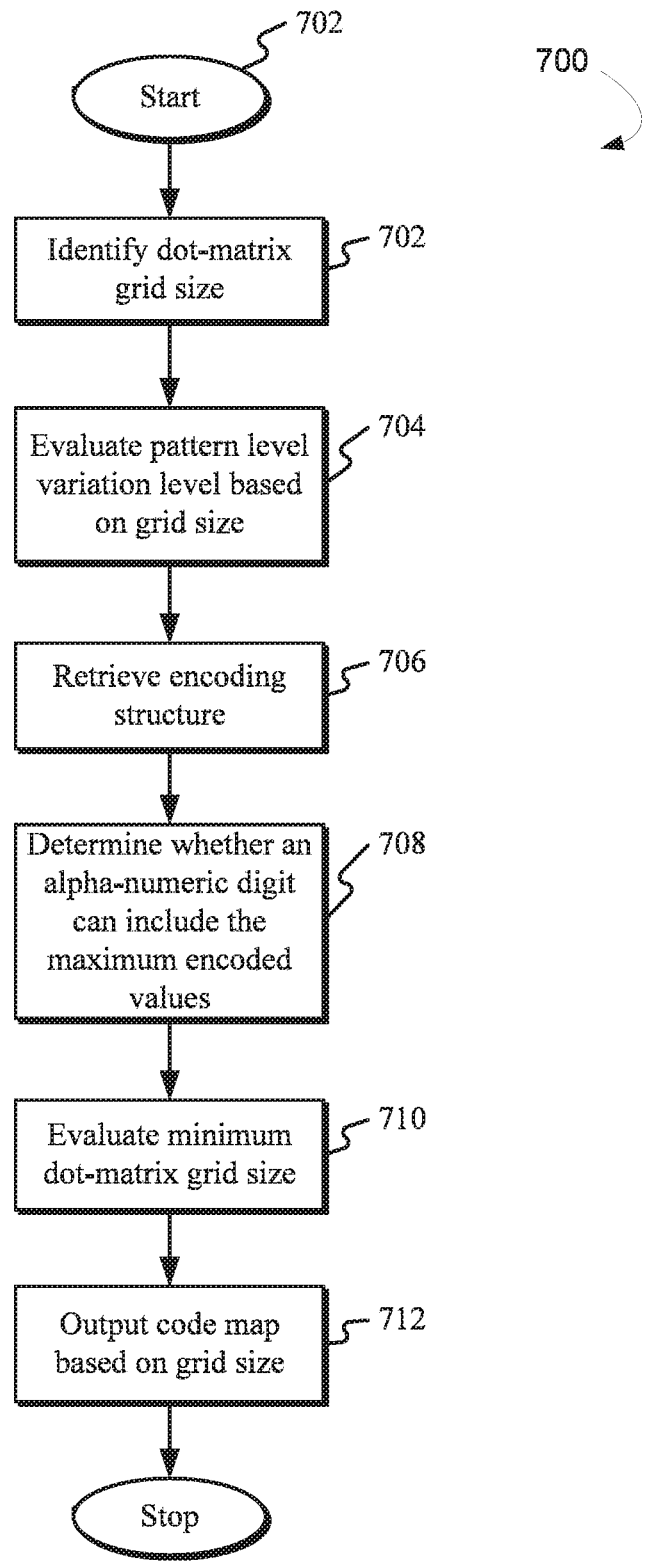
FIG. 7 depicts an exemplary method for encoding dot-matrix product information, according to one embodiment.

FIG. 7 depicts an exemplary method 700 for encoding dot-matrix product information, according to one or more embodiments. Referring now to FIG. 7, after an initial start step 702, in block 702, a processor (e.g., processor 1201, FIG. 12) identifies or receives a dot-matrix grid size.

In block 704, processor 1201 evaluates a dot pattern variation level of the dot-matrix based on the dot-matrix grid size. Dot-matrix grid size is determined based on the size of alpha-numeric characters needed for the printed information, and the amount of information to be encoded in the date portion, among other factors. In some aspects, the dot-matrix dot pattern variation level is indicative of a minimum k number of possible dot pattern variations of a digit that are human-readable using the dot-matrix grid size.

In block 706, processor 1201 retrieves an encoding structure, where the encoding structure is indicative of a plurality of product information attributes and a plurality of values for each of the plurality of product information attributes. The encoding structure may be stored on an operatively connected storage medium, or may be input by a user. For example, if a food company wants to protect information indicative of a plant, a line number, an operator, and a detailed packing time, there are 4 attributes to protect. If there are currently 14 plants, each plant has 5-10 lines, each line may be operated by 4-5 people, and the total detailed packing time contains 144 slots in a day, the number of values necessary to encode each respective attribute are 14 (plant), 10 (line number), 5 (operator), and 144 (detailed packing time).

In block 708, processor 1201 can determine whether an alpha-numeric digit can include a maximum number of encoded dot pattern values for the plurality product information attributes. In some aspects, the maximum number of encoded dot pattern values for the plurality product information attributes is less than or equal to the number of the plurality of values for each of the product information attributes. Processor 1201 may determine if the dot-matrix grid size has enough dot pattern variations to cover the information that needs to be protected.

For example, if there are 8 digits in the date portion (the total number of digits available for encoding information) and each digit can have k dot pattern variations, and there are M production attributes that require recording, the number of values the $i^{th}$ attribute can take is denoted by $L_i$. For each combination, processor 1201 can examine if there exist a feasible allocation of M attributes such that the product of the elements of the attribute value in each group is less than the relevant $k^n$. For this evaluation, processor 1201 may rank $L_i$ and try to find the maximum product of several $L_i$ values so that the product is still less than $k^n$ (starting from a smaller value of n). Processor 1201 may evaluate whether $k^8$ is greater than or equal to $L_1 \times L_2 \times \ldots \times L_M$. If V is indeed greater than or equal to $L_1 \times L_2 \times \ldots \times L_M$, then it is known that the maximum number of encoded dot pattern values is greater than a number of the plurality of values for each of the product information attributes. Next, processor 1201 determines whether or not to encode which product information attribute or group of attributes to which digit or group of digits.

In one aspect, processor 1201 all production information attributes may be encoded into all digits. For example, assume we have 8 digits and k=2. Assume that we want to encode 3 attributes: a state of production, where there are three choices of California (CA), Texas (TX) and Florida (FL), a plant number (where each state has 3 plants), and a work shift number (where each plant works 3 shifts). That is M=3 and $L_1=L_2=L_3=3$. Let's also denote variation #1 of the $i^{th}$ digit i_1 and the other variation of the $i^{th}$ digit i_2. Accordingly, in this example, $k^8$=512 and $L_1 \times L_2 \times \ldots \times L_M$=27, and thus, the former is greater than the latter.

In another example, a solution is to use all 8 digits to represent the 27 variations of attributes. For example, we can let (1_1, 2_1, 3_1, 4_1, 5_1, 6_1, 7_1, 8_1) denote (CA, plant 1, work shift 1), (1_1, 2_1, 3_1, 4_1, 5_1, 6_1, 7_1, 8_2) denote (CA, plant 1, work shift 2), (1_1, 2_1, 3_1, 4_1, 5_1, 6_1, 7_2, 8_1) denote (CA, plant 1, work shift 3), (1_1, 2_1, 3_1, 4_1, 5_1, 6_1, 7_2, 8_2) denote (CA, plant 2, work shift 1), etc. A drawback of this simplified solution is that all digits need to be evaluated to get some information. For example, in the abovementioned solution, we can not tell the work shift number without evaluating all the 8 digits.

As another example, let the $1^{st}$ and $2^{nd}$ digit together represent a state of production, the $3^{rd}$ and $4^{th}$ digit together represent a plant number and the $5^{th}$ and $6^{th}$ digit together represent a work shift number. In one aspect, a solution can include: (1_1, 2_1) denoting CA, (1_1, 2_2) denoting TX, (1_2, 2_1) denoting FL, (3_1, 4_1) denoting plant #1 in the specified state, (3_1, 4_2) denoting plant #2 in the specified state, (3_2, 4_1) denoting plant #3 in the specified state, (5_1, 6_1) denoting work shift #1 in the specified plant, (5_1, 6_2) denoting work shift #2 in the specified plant, and (5_2, 6_1) denoting work shift #3 in the specified plant. In this solution, (1_1, 2_1, 3_1, 4_1, 5_1, 6_1, . . . ) represents (CA, plant 1, work shift 1), (1_2, 2_1, 3_1, 4_2, 5_1, 6_1, . . . ) represents (FL, plant 2, work shift 1) . . . . In one non-limiting embodiment, one way to represent an example having 8 attributes by 8 digits, where each attribute has 3 values and with k=3, is to let each digit represent 1 attribute.

Figure 8:
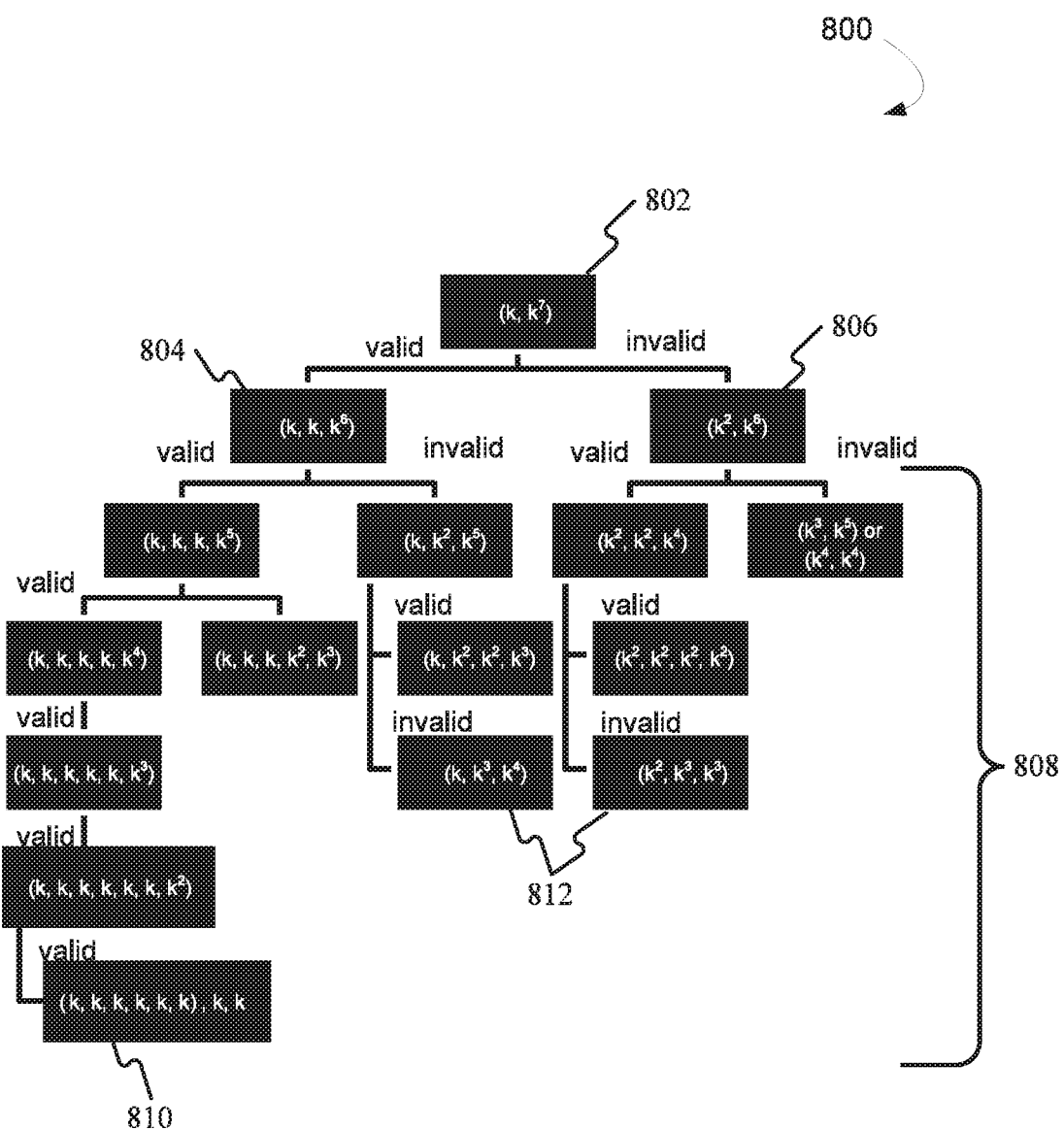
FIG. 8 depicts an exemplary tree diagram for determining whether a numeric digit can include a maximum number of encoded dot pattern values, according to one embodiment.

FIG. 8 depicts an exemplary tree diagram 800 for determining whether a numeric digit can include a maximum number of encoded dot pattern values, according to one embodiment. Referring now to FIG. 8, tree diagram 800 illustrates an exemplary search algorithm for an encoding determination. In some embodiments, at block 802 processor 1201 first checks if the 8 digits are separable into to 2 groups, (k,$k^7$). That is, processor 1201 can use 1 digit to represent 1 or several attributes and use the other 7 digits as a group to represent the remaining attributes. Block 804 represents a valid branch where the remaining attributes are separable into two groups. If the 8 digits are separable into two groups, processor 1201 further checks to see whether it can separate the 7-digit-group into two groups (thus resulting in 1 group "k" from block 802, and the second group "$k^7$" now split into "$k^6$" and "k"). Again, each k group represents some attributes. In the invalid branch 806, $k^8$ from block 802 could not be represented in only two groups. Therefore at block 806 processor 1201 tests whether the 8 attributes can be represented in two groups of $k^2$ and $k^6$. Iterative search steps 3 to 7 (808, collectively) demonstrate the similar iterative steps on both of valid branch 804 and invalid branch 806. Processor 1201 can stop searching when it can not further break down any group of digits, as shown at blocks 810 and 812, respectively.

Referring again to FIG. 7, in block 710, processor 1201 can evaluate a minimum dot-matrix grid size by increasing the dot-matrix grid size responsive to determining that the maximum number of encoded dot pattern values is greater than a number of the plurality of values for each of the product information attributes.

In block 712, processor 1201 can output a dot pattern code map based on the minimum dot-matrix grid size. In some aspects, the dot pattern code map is indicative of a relationship between each of the product information attributes and the plurality of values for each of the product information attributes. In some embodiments, processor 1201 may output a separate dot pattern code map for a plurality of dot-matrix grid sizes ranging from the minimum dot-matrix grid size to a predetermined maximum dot-matrix grid size.

Figure 9:
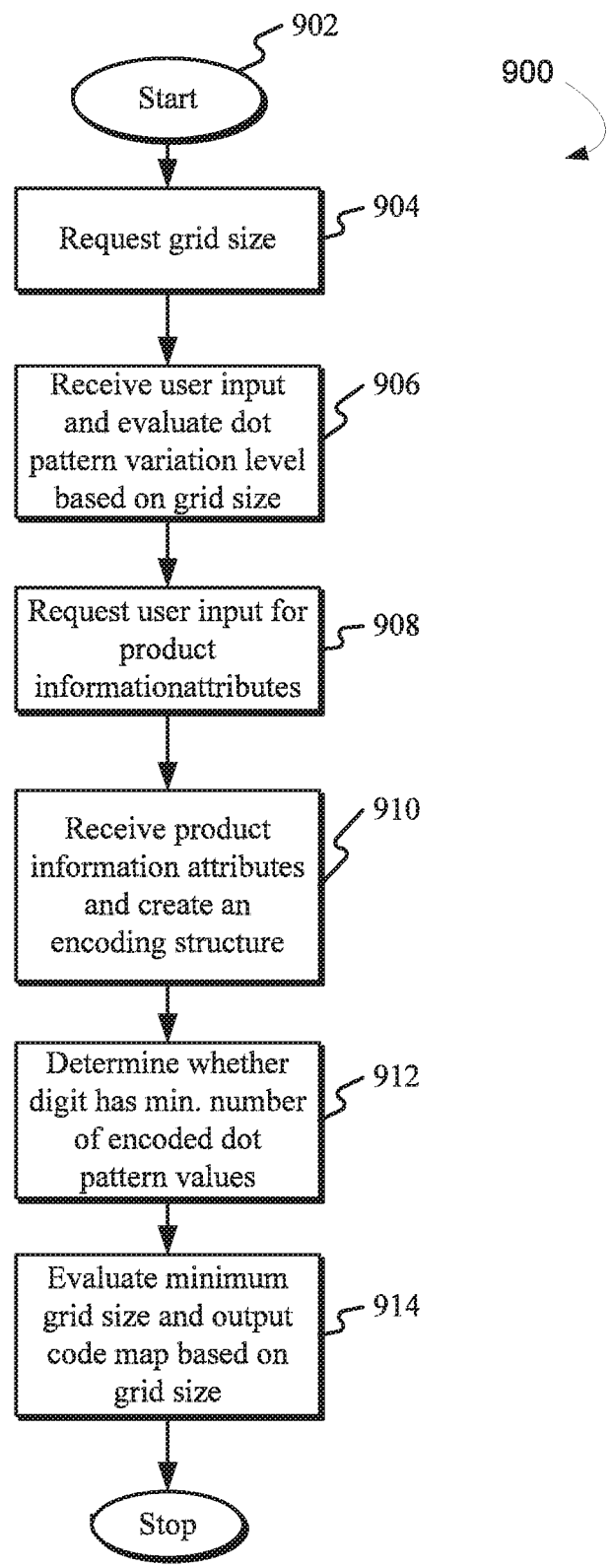
FIG. 9 depicts an exemplary computer-implemented method 900 for encoding dot-matrix product information, according to one embodiment.

FIG. 9 depicts an exemplary computer-implemented method 900 for encoding dot-matrix product information, according to one or more embodiments. Referring now to FIG. 9, after an initial start step 902, processor 1201 can output a request for user input indicative of a dot-matrix grid size, as shown in block 904.

In block 906, processor 1201 can receive the user input indicative of the dot-matrix grid size and evaluate a dot pattern variation level of the dot-matrix based on the dot-matrix grid size.

In block 908, processor 1201 can next output a request for user input indicative of a plurality of product information attributes.

In block 910, processor 1201 can receive a plurality of product information attributes. Processor 1201 may then create, for every alpha-numeric digit, an encoding structure. The encoding structure is indicative of a plurality of product information attributes and a plurality of values for each of the product information attributes.

In block 912, processor 1201 can determine whether an alpha-numeric digit having a minimum number of encoded dot pattern values for the user input grid size is equal to or greater than the plurality product information attributes.

In block 914, processor 1201 can evaluate a minimum dot-matrix grid size by increasing the dot-matrix grid size responsive to determining that the maximum number of encoded dot pattern values is greater than a number of the plurality of values for each of the product information attributes, and output a dot pattern code map based on the minimum dot-matrix grid size. In some aspects, the dot pattern code map is indicative of a relationship between each of the product information attributes and the plurality of values for each of the product information attributes.

Figure 10:
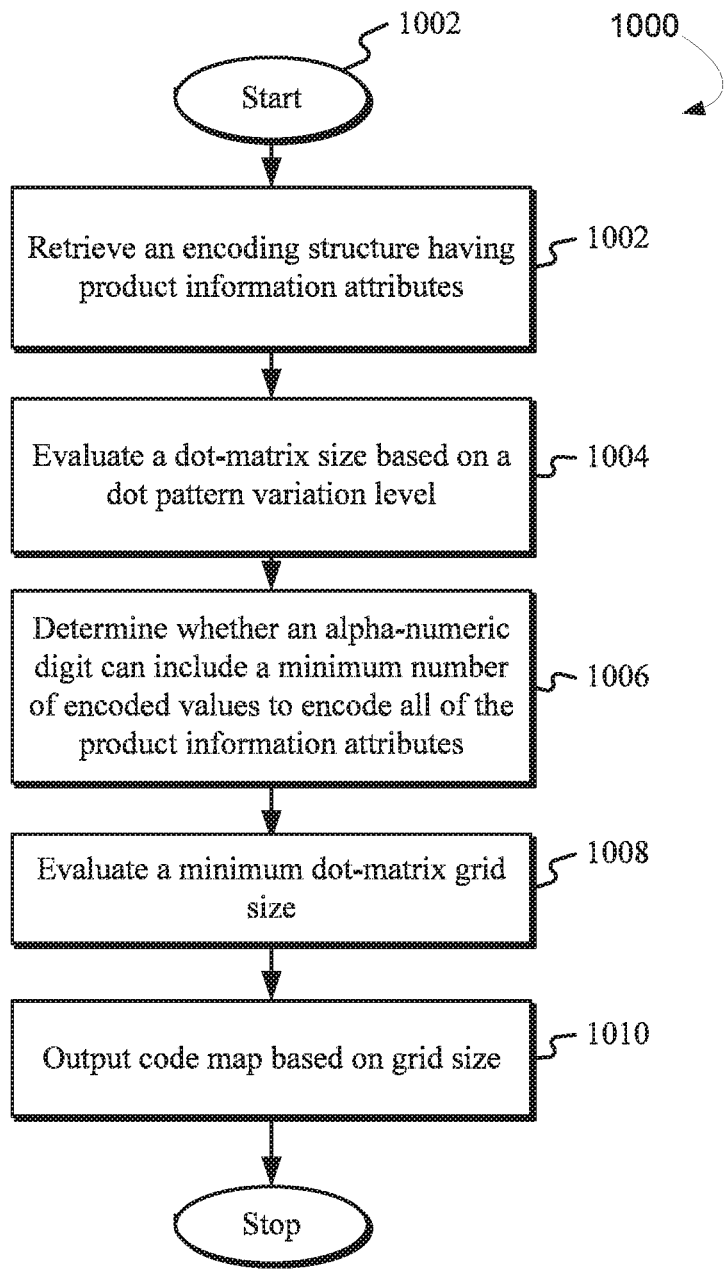
FIG. 10 depicts an exemplary method for decoding dot-matrix product information, according to one embodiment.

FIG. 10 depicts an exemplary method 1000 for decoding dot-matrix product information, according to one embodiment. Referring now to FIG. 10, after an initial start step 1001, in block 1002, processor 1201 can retrieve an encoding structure indicative of a plurality of product information attributes and a plurality of values for each of the product information attributes.

In block 1004, processor 1201 can evaluate dot-matrix grid size based on a dot pattern variation level of the dot-matrix.

In block 1006, processor 1201 can determine whether an alpha-numeric digit can include a minimum number of encoded dot pattern values to encode each of the plurality product information attributes.

In block 1008, processor 1201 can evaluate a minimum dot-matrix grid size by decreasing the dot-matrix grid size responsive to determining that minimum number of encoded dot pattern values cannot encode each of the plurality of product information attributes.

In block 1010, processor 1201 can output a dot pattern code map based on the minimum dot-matrix grid size. In some aspects, the dot pattern code map is indicative of a relationship between each of the product information attributes and the plurality of values for each of the product information attributes. Each alpha-numeric digit can encode all of the plurality of product information attributes.

Figure 11:
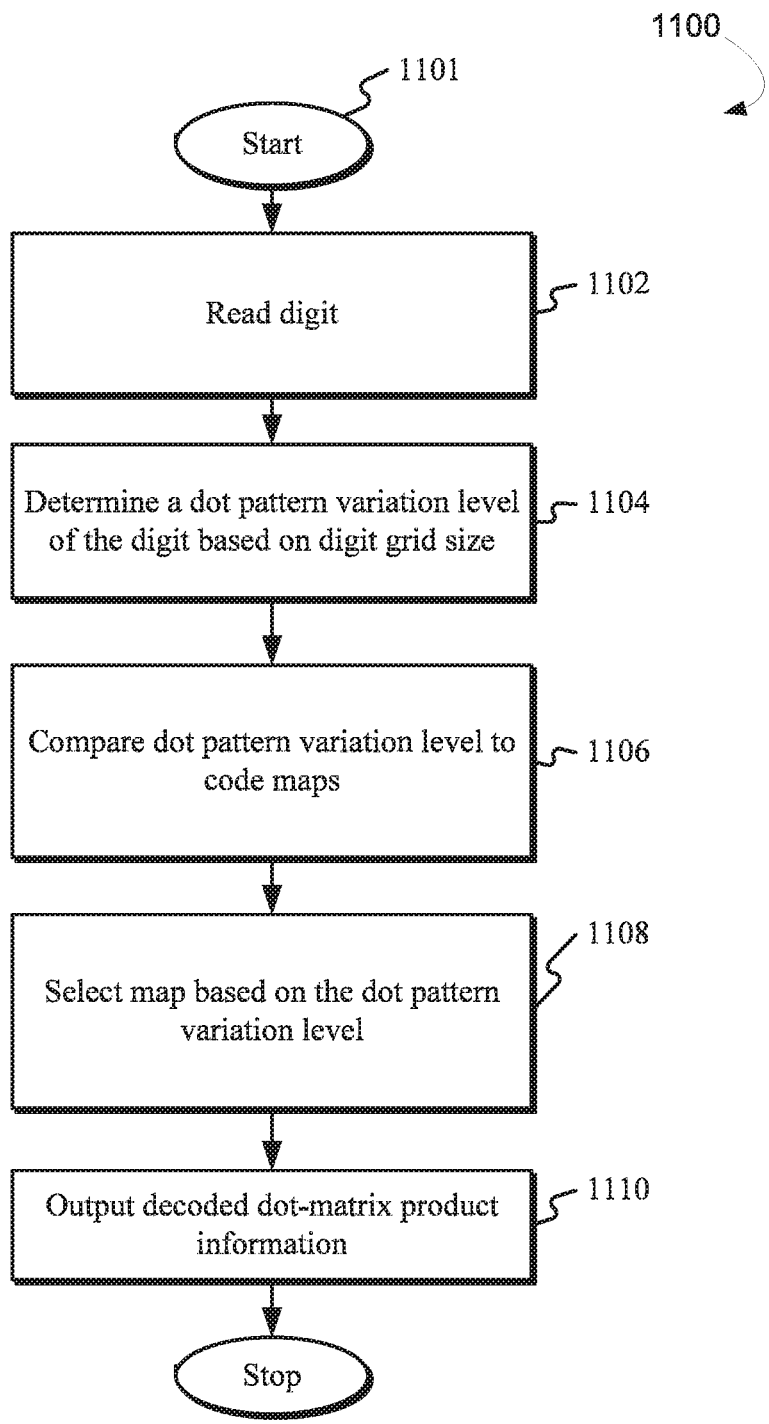
FIG. 11 depicts another exemplary method for decoding dot-matrix product information, according to one embodiment.

FIG. 11 depicts another exemplary method for decoding dot-matrix product information, according to one embodiment. As shown in FIG. 11, after an initial start step 1101, in block 1102 processor 1201 can read, via a processor connected to an input device (such as, for example, input device 1204, FIG. 12), an alpha-numeric digit having a dot-matrix grid size for a dot-matrix. Input device 1204 can be an optical scanning device, machine vision input, etc. According to some embodiments, he dot-matrix grid size is greater than a number of the plurality of values for each of the product information attributes.

Referring again to FIG. 11, in block 1104, processor 1201 can read an alpha-numeric digit having a dot-matrix grid size, and determine a dot-matrix dot pattern variation level of the alpha-numeric digit based on the dot-matrix grid size. In some aspects, the alpha-numeric digit of the dot-matrix product information includes an encoding structure indicative of a plurality of product information attributes and a plurality of values for each of the plurality of product information attributes. The encoding structure is based on a dot-matrix dot pattern variation level indicative of a minimum k number of possible dot pattern variations of a digit that are human-readable using the dot-matrix grid size, according to some embodiments. In other aspects, the dot-matrix dot pattern variation level is indicative of a maximum number of encoded dot pattern variations among a plurality of possible dot pattern variations for a dot-matrix alpha-numeric digit. The maximum number of encoded dot pattern values for the plurality product information attributes is less than or equal to a number of the plurality of values for each of the product information attributes, according to some embodiments.

According to other embodiments, all of the dot-matric product information is encoded in a single alpha-numeric digit. For example, a single digit may include a sufficient number of dots (due to a larger grid size) to encode a plurality of product information attributes in a single digit. Accordingly, each of the digits in a date code may contain all attributes needed to identify the product information.

In other aspects, in block 1106, processor 1201 can then compare the dot-matrix dot pattern variation level to a plurality of dot-matrix dot pattern code maps to determine a dot-matrix grid size having encoded dot-matrix product information. The dot pattern code maps may be stored in an operatively connected storage device (such as, for example memory 1202 or database 1221, FIG. 12.

Referring again to FIG. 11, in block 1108, processor 1201 can select, based on the dot pattern variation level of the alpha-numeric digit, a dot pattern code map indicative of a relationship between each of a plurality of product information attributes and the plurality of values for each of the product information attributes.

In block 1110, processor 1201 outputs a decoded dot-matrix product information based on the alpha-numeric digit and the selected dot pattern code map.

Figure 12:
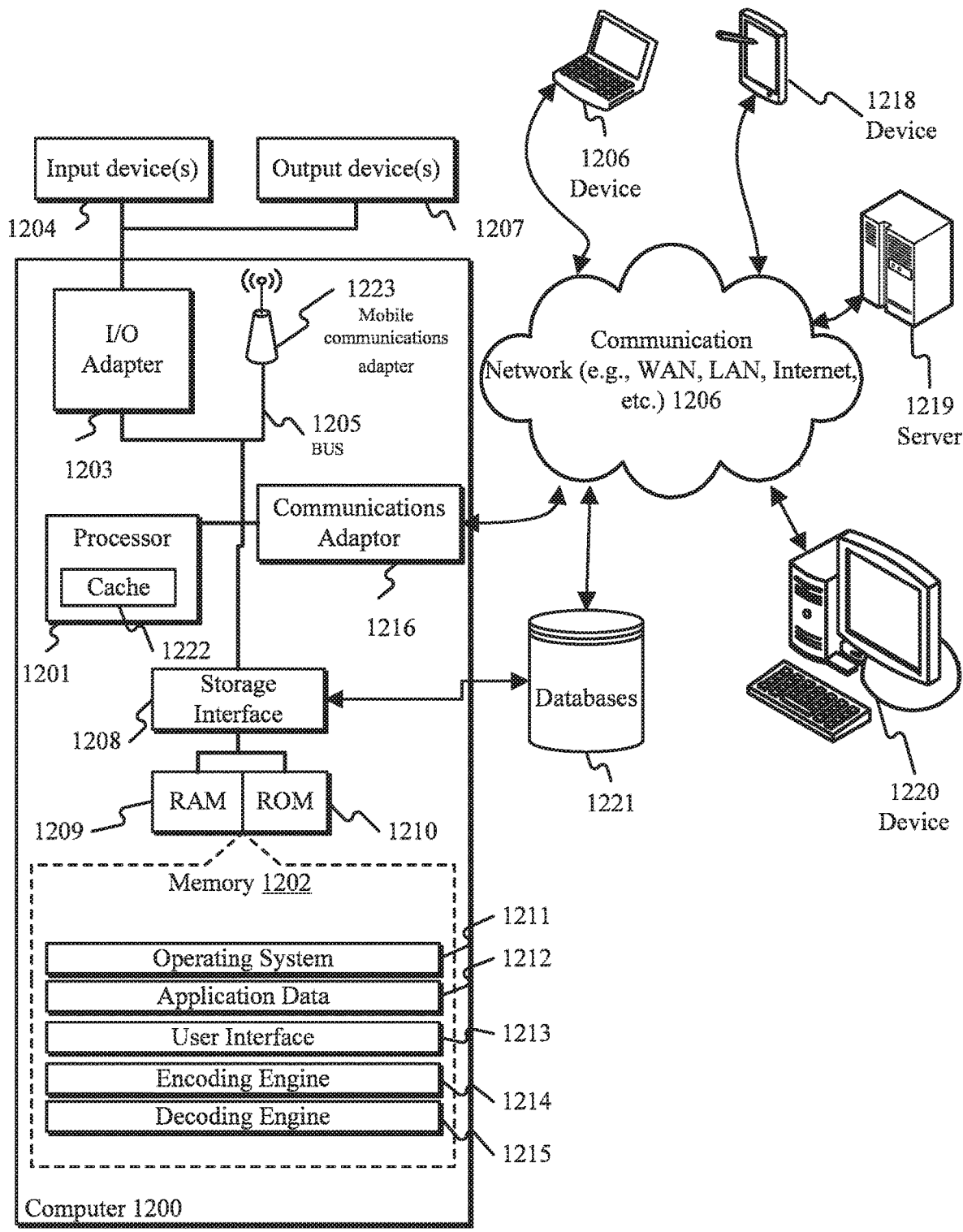
FIG. 12 depicts a block diagram of an exemplary computing environment and computer system, according to one embodiment.

FIG. 12 depicts a block diagram of an exemplary computing environment and computer system 1200, according to one embodiment. The environment and system described herein can be implemented in hardware, software (e.g., firmware), or a combination thereof. In an exemplary embodiment, a hardware implementation may include a microprocessor of a special or general-purpose digital computer, such as a personal computer, workstation, minicomputer, or mainframe computer. Computer 1200 therefore can embody a general-purpose computer. In another exemplary embodiment, the implementation can be part of a mobile device, such as, for example, a mobile phone, a personal data assistant (PDA), a tablet computer, etc.

As shown in FIG. 12, the computer 1200 includes processor 1201. Computer 1200 also includes memory 1202 communicatively coupled to processor 1201, and one or more input/output adapters 1203 that may be communicatively coupled via system bus 1205. Memory 1202 may be communicatively coupled to one or more internal or external memory devices via a storage interface 1208. Communications adapter 1216 may communicatively connect computer 1200 to one or more networks 1206. System bus 1205 may communicatively connect one or more user interfaces via input/output (I/O) adapter 1203. I/O adapter 1203 may communicatively connect a plurality of input devices 1204 to computer 1200. Input devices may include, for example, a keyboard, a mouse, a microphone, a sensor, etc. System bus 1205 may also communicatively connect one or more output devices 1207 via I/O adapter 1203. Output device 1207 may include, for example, a display, a speaker, a touchscreen, etc.

Processor 1201 is a hardware device for executing program instructions (aka software), stored in a computer-readable memory (e.g., memory 1202). Processor 1201 can be any custom made or commercially available processor, a central processing unit (CPU), a plurality of CPUs, for example, CPU 1201a-1201c, an auxiliary processor among several other processors associated with the computer 1200, a semiconductor based microprocessor (in the form of a microchip or chip set), or generally any device for executing instructions. Processor 1201 can include a cache memory 1222, which may include, but is not limited to, an instruction cache to speed up executable instruction fetch, a data cache to speed up data fetch and store, and a translation lookaside buffer (TLB) used to speed up virtual-to-physical address translation for both executable instructions and data. Cache memory 1222 may be organized as a hierarchy of more cache levels (L1, L2, etc.).

Processor 1201 may be disposed in communication with one or more memory devices (e.g., RAM 1209, ROM 1210, one or more external databases 1221, etc.) via a storage interface 1208. Storage interface 1208 may also connect to one or more memory devices including, without limitation, one or more databases 1221, and/or one or more other memory drives (not shown) including, for example, a removable disc drive, etc., employing connection protocols such as serial advanced technology attachment (SATA), integrated drive electronics (IDE), IEEE-1394, universal serial bus (USB), fiber channel, small computer systems interface (SCSI), etc. The memory drives may be, for example, a drum, a magnetic disc drive, a magneto-optical drive, an optical drive, a redundant array of independent discs (RAID), a solid-state memory device, a solid-state drive, etc.

Memory 1202 can include random access memory (RAM) 1209 and read only memory (ROM) 1210. RAM 1209 can be any one or combination of volatile memory elements (e.g., DRAM, SRAM, SDRAM, etc.). ROM 1210 can include any one or more nonvolatile memory elements (e.g., erasable programmable read only memory (EPROM), flash memory, electronically erasable programmable read only memory (EEPROM), programmable read only memory (PROM), tape, compact disc read only memory (CD-ROM), disk, cartridge, cassette or the like, etc.). Moreover, memory 1202 may incorporate electronic, magnetic, optical, and/or other types of non-transitory computer-readable storage media. Memory 1202 may also be a distributed architecture, where various components are situated remote from one another, but can be accessed by processor 1201.

The instructions in memory 1202 may include one or more separate programs, each of which may comprise an ordered listing of computer-executable instructions for implementing logical functions. In the example of FIG. 12, the instructions in memory 1202 may include an operating system 1211. Operating system 1211 can control the execution of other computer programs and provides scheduling, input-output control, file and data management, memory management, and communication control and related services.

The program instructions stored in memory 1202 may further include application data 1212, and for a user interface 1213.

Memory 1202 may also include program instructions for encoding in accordance with the present invention. For example, an encoding engine 1214, configured to identify a dot-matrix grid size for a dot-matrix, evaluate a dot pattern variation level of the dot-matrix based on the grid size, retrieve an encoding structure, determine whether an alpha-numeric digit can include a maximum number of encoded dot pattern values for the plurality of plurality product information attributes, evaluating a minimum dot-matrix grid size by increasing the dot-matrix grid size responsive to determining that the maximum number of encoded dot pattern values is greater than a number of the plurality of values for each of the product information attributes, and output a dot pattern code map based on the minimum dot-matrix grid size, where the dot pattern code map is indicative of a relationship between each of the product information attributes and the plurality of values for each of the product information attributes.

Memory 1202 may include program instructions for decoding in accordance with the present invention. For example, a decoding engine 1215, which may be configured to read, via the optical scanning device, an alpha-numeric digit having a dot-matrix grid size, determine a dot pattern variation level of the alpha-numeric digit based on the dot-matrix grid size, compare the dot pattern variation level to a plurality of dot pattern code maps to determine a dot-matrix grid size having encoded dot-matrix product information, select, based on the dot pattern variation level of the alpha-numeric digit, a dot pattern code map indicative of a relationship between each of a plurality of product information attributes and the plurality of values for each of the product information attributes, and output decoded dot-matrix product information based on the alpha-numeric digit and the selected dot pattern code map.

I/O adapter 1203 can be, for example but not limited to, one or more buses or other wired or wireless connections. I/O adapter 1203 may have additional elements (which are omitted for simplicity) such as controllers, microprocessors, buffers (caches), drivers, repeaters, and receivers, which may work in concert to enable communications. Further, I/O adapter 1203 may facilitate address, control, and/or data connections to enable appropriate communications among the aforementioned components.

I/O adapter 1203 can further include a display adapter coupled to one or more displays. I/O adapter 1203 may be configured to operatively connect one or more input/output (I/O) devices 1207 to computer 1200. For example, I/O 1203 may connect a keyboard and mouse, a touchscreen, a speaker, a haptic output device, or other output device. Output devices 1207 may include but are not limited to a printer, a scanner, and/or the like. Other output devices may also be included, although not shown. Finally, the I/O devices connectable to I/O adapter 1203 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like.

According to some embodiments, computer 1200 may include a mobile communications adapter 1223. Mobile communications adapter 1223 may include GPS, cellular, mobile, and/or other communications protocols for wireless communication.

In some embodiments, computer 1200 can further include communications adapter 1216 for coupling to a network 1206.

Network 1206 can be an IP-based network for communication between computer 1200 and any external device. Network 1206 transmits and receives data between computer 1200 and devices and/or systems external to computer 1200. In an exemplary embodiment, network 1206 can be a managed IP network administered by a service provider. Network 1206 may be a network internal to an aircraft, such as, for example, an avionics network, etc. Network 1206 may be implemented in a wireless fashion, e.g., using wireless protocols and technologies, such as WiFi, WiMax, etc. Network 1206 may also be a wired network, e.g., an Ethernet network, an ARINC 429 network, a controller area network (CAN), etc., having any wired connectivity including, e.g., an RS232 connection, R5422 connection, etc. Network 1206 can also be a packet-switched network such as a local area network, wide area network, metropolitan area network, Internet network, or other similar type of network environment. The network 1206 may be a fixed wireless network, a wireless local area network (LAN), a wireless wide area network (WAN) a personal area network (PAN), a virtual private network (VPN), intranet or other suitable network system.

Network 1206 may operatively connect computer 1200 to one or more devices including device 1217, device 1218, and device 1220. Network 1206 may also connect computer 1200 to one or more servers such as, for example, server 1219.

If computer 1200 is a PC, workstation, laptop, tablet computer and/or the like, the instructions in the memory 1202 may further include a basic input output system (BIOS) (omitted for simplicity). The BIOS is a set of routines that initialize and test hardware at startup, start operating system 1211, and support the transfer of data among the operatively connected hardware devices. The BIOS is typically stored in ROM 1210 so that the BIOS can be executed when computer 1200 is activated. When computer 1200 is in operation, processor 1201 may be configured to execute instructions stored within the memory 1202, to communicate data to and from the memory 1202, and to generally control operations of the computer 1200 pursuant to the instructions.

Embodiments of the present invention are directed to encoding and decoding dot-matrix product information in the food and drug distribution system. As described herein, dot-matrix printing is commonly used for tracking food manufacturing and distribution. However, embodiments of the present invention are not limited to food and drug products or distribution thereof. By way of example only, the present invention may be applied to other manufactured products, such as household products, products intended for use by children, and/or or automobiles.

Although dot-matrix product information printed on product packaging, may be tampered with or damaged embodiments of the present invention can better preserve the full manufacturing tracking information by encoding all of the information in a select few, or even one, digit. Accordingly, some embodiments of the present invention may help prevent health and/or safety issues through improved tracking of products that would have otherwise become untraceable because portions of the dot-matrix product information were destroyed.

Embodiments of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for encoding dot-matrix product information, the method comprising:
    receiving, by a processor, a user input, the user input indicative of a dot-matrix grid size;
    determining, by the processor, a dot pattern variation level corresponding to the dot-matrix grid size;
    receiving, by the processor, a second user input, the second user input indicative of a plurality of product information attributes;
    generating, for each alpha-numeric digit, an encoding structure, wherein the encoding structure is indicative of the plurality of product information attributes and a plurality of values for each of the product information attributes;
    determining, by the processor, that an alpha-numeric digit having a minimum number of encoded dot pattern values for the input grid size is equal to or greater than the plurality of product information attributes;
    determining, by the processor, a minimum dot-matrix grid size by increasing the dot-matrix grid size responsive to determining that a maximum number of encoded dot pattern values is greater than a number of the plurality of values for each of the product information attributes; and
    outputting a dot pattern code map based on the minimum dot-matrix grid size.

2. The computer-implemented method of claim 1, wherein the dot pattern variation level is indicative of a respective number of dot pattern variations in the dot-matrix grid that are usable for each alpha-numeric digit.

3. The computer-implemented method of claim 2, wherein each dot pattern variation is readable as being representative of a single respective corresponding alpha-numeric digit.

4. The computer-implemented method of claim 1, wherein the dot pattern variation level is indicative of a maximum number of encoded dot pattern variations for the particular alpha-numeric digit, and wherein the maximum number of encoded dot pattern variations of the particular alpha-numeric digit is less than a total number of possible dot pattern variations of the particular alpha-numeric digit.

5. The computer-implemented method of claim 1, wherein the dot pattern code map indicates an encoding structure for the dot-matrix product information at the dot pattern variation level.

6. The computer-implemented method of claim 5, wherein the encoding structure indicates a correspondence between each dot pattern variation readable as the particular alpha-numeric digit and a respective one or more attribute values of one or more product information attributes.

7. The computer-implemented method of claim 1, wherein the particular alpha-numeric digit encodes multiple product information attributes.

8. A system for decoding dot-matrix product information, comprising:
    at least one memory storing computer-executable instructions; and
    at least one processor configured to access the at least one memory and execute the computer-executable instructions to:
        receive a user input, the user input indicative of a dot-matrix grid size;
        determine a dot pattern variation level corresponding to the dot-matrix grid size;
        receive a second user input, the second user input indicative of a plurality of product information attributes;
        generate, for each alpha-numeric digit, an encoding structure, wherein the encoding structure is indicative of the plurality of product information attributes and a plurality of values for each of the product information attributes;
        determine that an alpha-numeric digit having a minimum number of encoded dot pattern values for the input grid size is equal to or greater than the plurality of product information attributes;
        determine a minimum dot-matrix grid size by increasing the dot-matrix grid size responsive to determining that a maximum number of encoded dot pattern values is greater than a number of the plurality of values for each of the product information attributes; and
        output a dot pattern code map based on the minimum dot-matrix grid size.

9. The system of claim 8, wherein the dot pattern variation level is indicative of a respective number of dot pattern variations in the dot-matrix grid that are usable for each alpha-numeric digit.

10. The system of claim 9, wherein each dot pattern variation is readable as being representative of a single respective corresponding alpha-numeric digit.

11. The system of claim 8, wherein the dot pattern variation level is indicative of a maximum number of encoded dot pattern variations for the particular alpha-numeric digit, and wherein the maximum number of encoded dot pattern variations of the particular alpha-numeric digit is less than a total number of possible dot pattern variations of the particular alpha-numeric digit.

12. The system of claim 8, wherein the dot pattern code map indicates an encoding structure for the dot-matrix product information at the dot pattern variation level.

13. The system of claim 12, wherein the encoding structure indicates a correspondence between each dot pattern variation readable as the particular alpha-numeric digit and a respective one or more attribute values of one or more product information attributes.

14. The system of claim 8, wherein the particular alpha-numeric digit encodes multiple product information attributes.

15. A computer program product for decoding dot-matrix product information, the computer program product comprising a non-transitory computer readable storage medium having program instructions embodied therewith, the program instructions executable by a processor to cause the processor to perform a method comprising:
- receiving, by the processor, a user input, the user input indicative of a dot-matrix grid size;
- determining, by the processor, a dot pattern variation level corresponding to the dot-matrix grid size;
- receiving, by the processor, a second user input, the second user input indicative of a plurality of product information attributes;
- generating, for each alpha-numeric digit, an encoding structure, wherein the encoding structure is indicative of the plurality of product information attributes and a plurality of values for each of the product information attributes;
- determining, by the processor, that an alpha-numeric digit having a minimum number of encoded dot pattern values for the input grid size is equal to or greater than the plurality of product information attributes;
- determining, by the processor, a minimum dot-matrix grid size by increasing the dot-matrix grid size responsive to determining that a maximum number of encoded dot pattern values is greater than a number of the plurality of values for each of the product information attributes; and
- outputting a dot pattern code map based on the minimum dot-matrix grid size.

16. The computer program product of claim 15, wherein the dot pattern variation level is indicative of a respective number of dot pattern variations in the dot-matrix grid that are usable for each alpha-numeric digit.

17. The computer program product of claim 16, wherein each dot pattern variation is readable as being representative of a single respective corresponding alpha-numeric digit.

18. The computer program product of claim 15, wherein the dot pattern variation level is indicative of a maximum number of encoded dot pattern variations for the particular alpha-numeric digit, and wherein the maximum number of encoded dot pattern variations of the particular alpha-numeric digit is less than a total number of possible dot pattern variations of the particular alpha-numeric digit.

19. The computer program product of claim 15, wherein the dot pattern code map indicates an encoding structure for the dot-matrix product information at the dot pattern variation level.

20. The computer program product of claim 19, wherein the encoding structure indicates a correspondence between each dot pattern variation readable as the particular alpha-numeric digit and a respective one or more attribute values of one or more product information attributes.

* * * * *